TELEPHONE SUBSET

Original Filed March 16, 1961 3 Sheets-Sheet 1

INVENTORS
Wilfred C. Nise
Martin J. Stevko
BY
C. A. Gulbrandsen
Atty.

TELEPHONE SUBSET

Original Filed March 16, 1961 3 Sheets-Sheet 2

INVENTORS
Wilfred C. Nise
Martin J. Stevko
BY
C. A. Gulbrandsen
Atty.

TELEPHONE SUBSET

Original Filed March 16, 1961 3 Sheets-Sheet 3

INVENTORS
Wilfred C. Nise
Martin J. Stevko
BY
C. A. Gulbrandsen
Atty.

United States Patent Office

Re. 26,034
Reissued June 14, 1966

26,034
TELEPHONE SUBSET

Wilfred C. Nise, Des Plaines, and Martin J. Stevko, Addison, Ill., assignors to Automatic Electric Laboratories, Inc., Northlake, Ill., a corporation of Delaware Original No. 3,136,865, dated June 9, 1964, Ser. No. 96,323, Mar. 16, 1961. Application for reissue Sept. 24, 1965, Ser. No. 491,503
13 Claims. (Cl. 179—100)

Matter enclosed in heavy brackets [ ] appears in the original patent but forms no part of this reissue specification; matter printed in italics indicates the additions made by reissue.

This invention relates to telephone equipment, and more particularly, to a new and novel construction of a telephone substation instrument.

In the development of the telephone field, telephone subset construction has been relatively neglected. There have been many innovations to provide a more versatile and functional subset, and only recently have there arisen significant changes in the outward appearance of the subset. However, there has been no major change in the fundamental construction of the subset, that is, a change from the conventional construction which features a base on which are mounted the components and to which the subset housing is attached.

It is a particular object of this present invention therefore, to provide a telephone subset which employs a unique and improved mounting arrangement.

A further object is the provision of a telephone subset which lends itself well to rapid assembly and maintenance.

A feature of this invention is the provision of a telephone subset having a housing made up of two shells fastened to a center divider plate.

A further feature of this invention is the provision of a telephone subset having a center divider plate both sides of which serve as a mounting surface for the components.

A further feature of this invention is the provision of a telephone subset having a center divider plate which has legs serving as a support for the center plate during assembly and maintenance.

A further feature of this invention is the provision of a telephone subset having hookswitch actuating bars of the general type disclosed and claimed in patent application Serial No. 21,454, now U.S. Patent 2,990,456 issued to W. C. Nise, except that the hookswitch actuating bars are pivoted in front of the handset wells, and the top edge of the actuating bars are slanted from the horizontal such that the rear edge is higher than the front edge.

A further feature of this invention is the provision of a telephone subset having a lamp mounted under a push button by means of a section of translucent plastic tubing.

Briefly, the embodiment of the invention described herein relates to a loudspeaking telephone subset having a housing made of an upper shell and a lower shell, both fastened to a center plate. The center plate has legs which serve to support the plate when it is removed from the two shells. A typical circuit for the loudspeaking telephone subset shown herein has been disclosed in co-pending patent application Serial No. 844,393, filed October 5, 1959, by R. T. Cleary.

The invention will be more fully understood from the following detailed description of an embodiment thereof. In the accompanying drawings.

Figure 1:
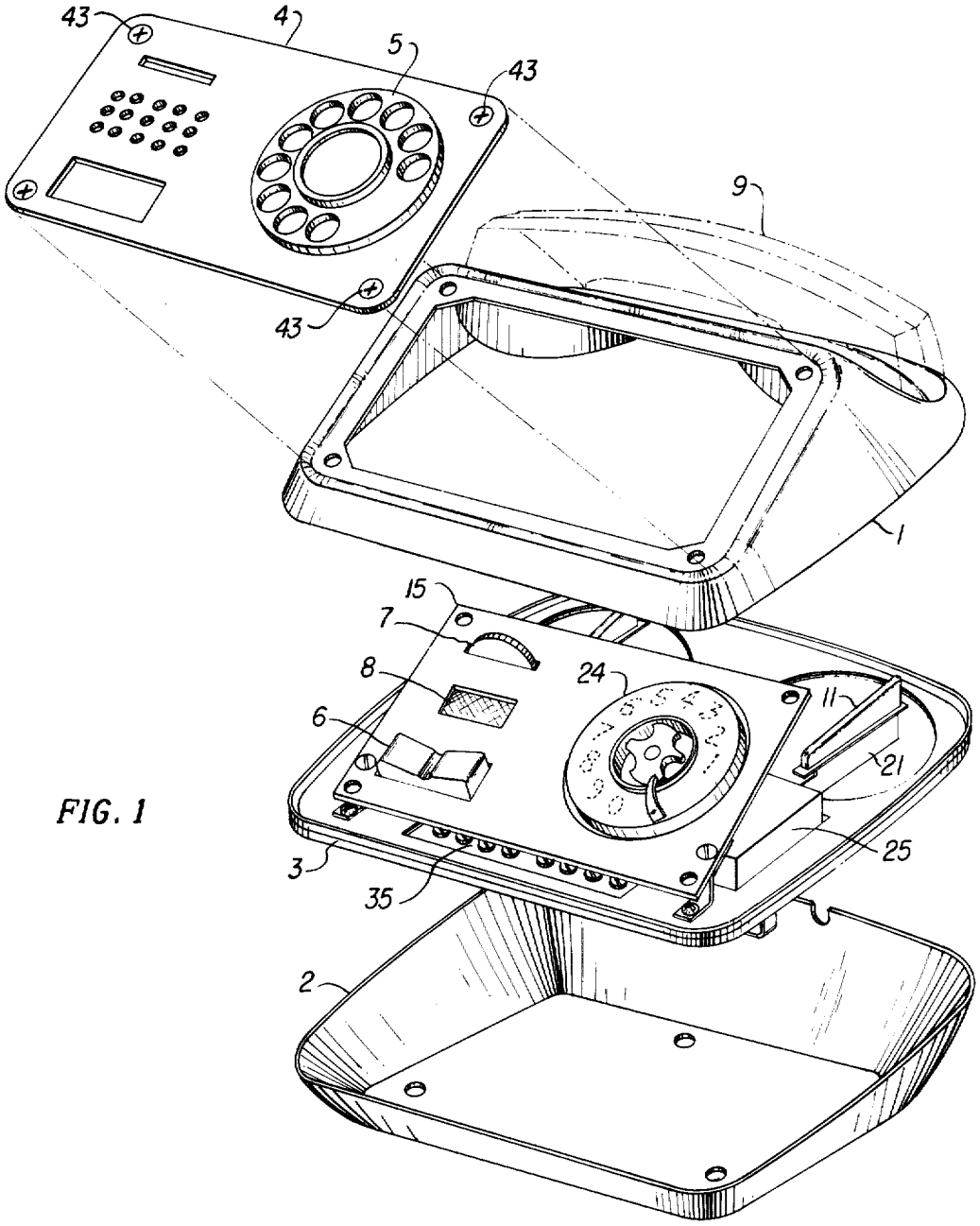
FIG. 1 is an exploded perspective view of the subset showing the upper shell and the handset, the center plate with the components mounted thereon, and the lower shell.
Figure 3:
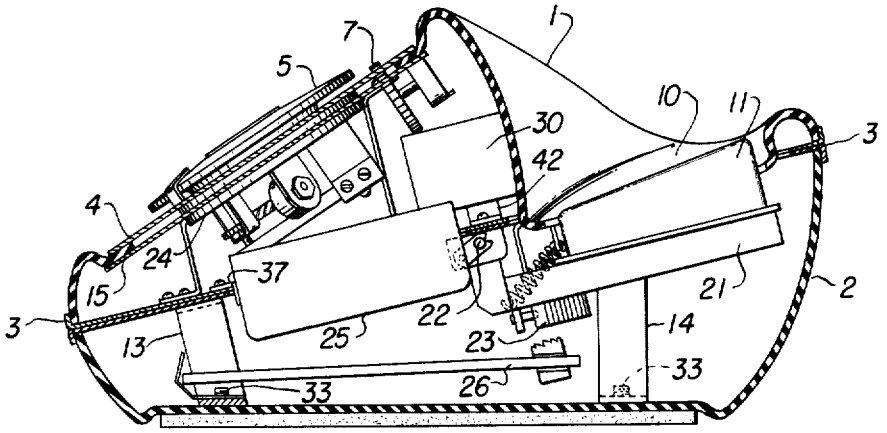
FIG. 3 is a cross section taken along line 3—3 of FIG. 2 showing, among other parts, the legs which support the plate when it is removed from the shells, and the hookswitch arm and its pivot arrangement.

Referring now to the drawings it may be noted that in FIGS. 1 and 3, the upper shell 1, center plate 3, and lower shell 2 of the loudspeaking telephone subset are shown in non-assembled and assembled condition respectively. The plate 3 is composed of two identical flanged plates positioned back to back. The flanged portions serve as retaining walls for the lower edge of shell 1 as well as for the upper edge of shell 2.

Shells 1 and 2 are preferably made of vacuum molded plastic material. The upper shell 1 has a flattened front portion with a forward downward slant, upon which is mounted plate 4. This plate is attached to bracket 15 which is in turn mounted on center plate 3. Plate 4 thus serves as an escutcheon plate for the components mounted on bracket 15 to be considered later. The lower shell 2 is generally dish-shaped and has a generally flat bottom portion serving as a base for the subset. The rear edge of shell 2 is slightly higher than the front edge, thus with the subset assembled, the plate 4 is tipped forward slightly to further enhance the accessibility of the components mounted thereon by the user. As a further result of this construction, it becomes possible, as seen in FIG. 2, to form the rear portion of upper shell 1 into two recessed areas, or wells, 10 for accommodating the transmitter and receiver capsules of a handset 9.

Figure 4:
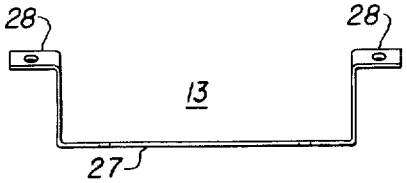
FIG. 4 is a perspective view of a U-shaped leg of the center plate.

Brackets 13 and 14 as shown in FIG. 3, extend from the lower surface of plate 3 and serve as mounting brackets to which lower shell 2 is fastened. Brackets 13 and 14 are generally U-shaped, for example, see bracket 13 as shown in FIG. 4, where it is observed that its center portion 27 has holes therein for attaching the lower shell 2 to the center structure by means of screws 33, the upper portions 28 of bracket 13 being attached to the center plate 3. In this way, the uper edge of shell 2 may be tightly abutted against the lower surface of plate 3 when screws 33 are tightened. In addition, when shells 1 and 2 are removed from plate 3, such as for inspection or maintenance of the telephone, brackets 13 and 14 then serve as legs to support plate 3, for example on a work bench. Shell 1 is similarly abutted against the upper surface of plate 3 by means of screws 43 which fasten to bracket 15.

Figure 6:
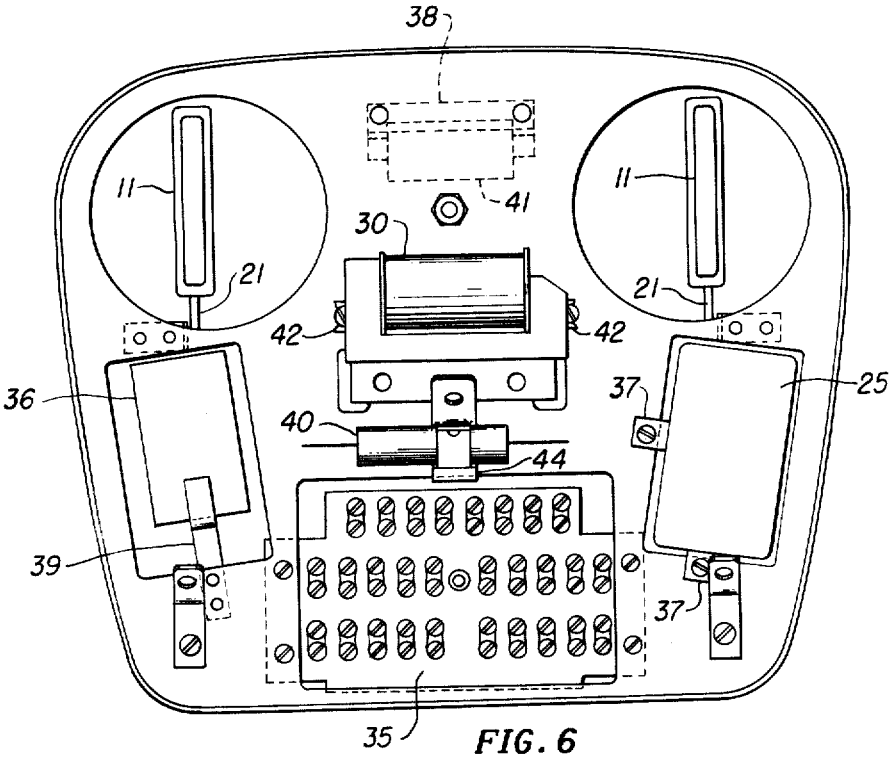
FIG. 6 is a top view of the center plate with the slanted bracket 15, FIG. 1, removed, showing the mounting of the components on the center plate.

The components of the subset, which may be generally as described in the aforementioned patent application by R. T. Cleary, are mounted on both sides of center plate 3, as shown in FIGS. 1, 3, and 6. For example, transmission network 25 is held within an aperture in plate 3 by the two mounting brackets 37 which are fastened to network 25 and to the upper surface of plate 3; flasher assembly 36 is similarly held in an aperture in plate 3 by bracket 39 which is fastened to the lower surface of plate 3; induction coil assembly 30 and capacitor 40 are held to the upper surface of plate 3 by brackets 42 and 44 respectively. Hookswitch spring pile up 23 and transformer assembly 41 are likewise attached to the lower surface of center plate 3 by mounting brackets. In addition, slanted bracket 15, which is fastened to the upper surface of center plate 3, mounts several components, namely, dial 24 with finger wheel 5, volume control 7, push-button 6, and microphone 8.

Figure 2:
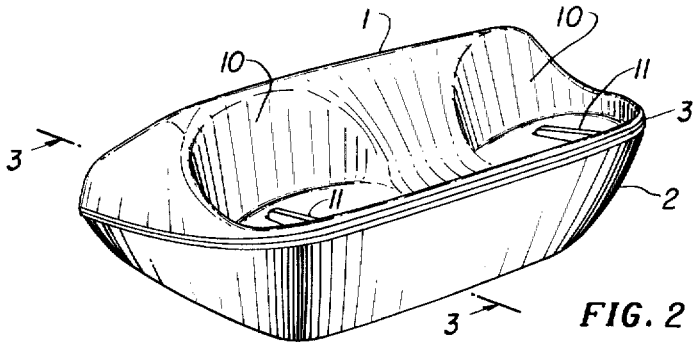
FIG. 2 is a perspective view showing the rear of the subset and the recesses formed to accommodate the handset.

The hookswitch bars 11 as viewed in FIGS. 2 and 3, protrude slightly above the floor of recessed portions 10. Arm 21, to which bar 11 is attached, pivots about pin 22 which is in front of the recessed portions 10. It is noted that the floor of recessed portions 10 has slots through which actuating bars 11 extend. This floor is slanted downwardly from front to rear with respect to the horizontal. An advantage of this construction is that the handset is guided into the closed end of the recessed portions 10. The top edge of bars 11 are slanted in the same direction as the floor of recessed portions 10, but at an angle of slant which is slightly greater. The previously mentioned Nise patent discloses a somewhat similar hookswitch mechanism, however the pivot point of hookswitch bars 11 is behind the recessed portions 10, and the floor of the recessed portions 10 has no slant from front to rear.

Figure 5:
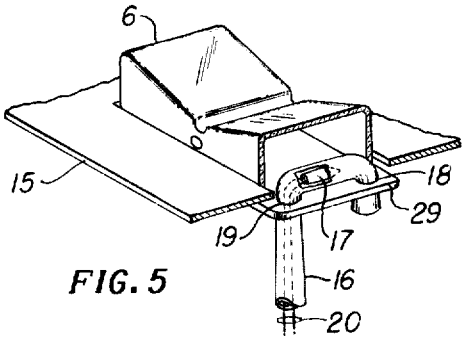
FIG. 5 is a cross section showing the mounting means for the lamp under the push-button.

Push-button 6, as viewed in FIG. 5, is a rocker-type on-off switch for use on a loudspeaking telephone; it is mounted on plate 15 and serves as a housing for tubing 16. Both push-button 6 and tubing 16 are of translucent material such that when lamp 17 is lighted the push-button is illuminated from underneath. Tubing 16 is mounted in slots 18 and 19 in plate 29 which is attached to plate 15. Slots 18 and 19 are slightly smaller in diameter than tubing 16 such that when the ends of tubing 16 are threaded therein, they are held tightly to plate 29 without further attachment. It is noted that tubing 16 forms a U-shape, with lamp 17 positioned in the center portion of the U, and the lamp connecting wires 20 extend from one leg of the U. Lamp 17 is shown mounted under the "on" side of the on-off rocker-button, and is electrically connected such that it lights when the "on" side is pushed, and extinguishes when the "off" side is pushed.

The loudspeaking telephone is thus seen to be constructed of three basic parts; the upper and lower shells, and the center mounting plate. Because of this type of construction, the center plate can be assembled in several stages with the components mounted in the described manner in a space-saving fashion, while the legs serve to hold the plate in a convenient position. Then, as the last step in assembly, the upper and lower shells and escutcheon plate are added, completing the subset.

While we have described the above principles of our invention in connection with specific embodiment, it is to be clearly understood that this description is made only by way of example and not as a limitation to the scope and spirit of our invention as hereinafter claimed.

What is claimed is:

1. A telephone subset comprising:
a handset, a dial and a plurality of other electrical components including an induction coil,
a housing including an upper shell of molded plastic material supporting said handset, and a lower shell of molded plastic material having a bottom portion serving as a base for said housing,
and a center plate to which said upper and lower shells are fastened, said center plate mounting said other electrical components.

2. A telephone subset as claimed in claim [1] *13* wherein said upper and lower shells are [formed by vacuum molding] *made of molded plastic material.*

3. A telephone subset as claimed in claim [1] *13 comprising a calling device fastened to said plate, and* wherein said upper shell has a [rear] recessed portion for supporting said handset and a [relatively flat] front portion with an aperture through which said [dial] *calling device* extends.

4. A telephone subset as claimed in claim [1] *13* wherein both sides of said center plate serve as mounting surfaces for said [other] *plurality of electrical* components.

5. A telephone subset as claimed in claim [1] *13* wherein said center plate has a plurality of downwardly extending leg members for supporting said center plate when said [upper end] lower [shells are] *shell is* removed.

6. A telephone subset as claimed in claim 5 wherein said leg members are [in the form of brackets to which] *fastened to* said lower shell [is fastened] with the outer edge of said [shell] *open top section* abutting against said center plate.

7. A loudspeaker telephone subset comprising a [dial] *calling device,* a handset, [a hookswitch having actuating bars] *hookswitch means including handset actuated hookswitch means and manually actuated hookswitch means, and* a transducer, [and manual control means,] and also comprising:
an upper housing shell [of molded plastic material],
a lower housing shell [of molded plastic material],
a component-mounting center plate to which said upper and lower shells are fastened respectively,
the upper shell having a [rear] recessed portion [with two wells for receiving the two ends, respectively, of said handset, the bottom surfaces of said wells having slots formed therein, and having a flat slanted front portion with a central aperture] *for receiving said handset, said recessed portion having apertures therein, said handset actuated hookswitch means being carried by said center plate and extending through the apertures in said recessed portion, said upper shell further having a front portion with an aperture therein,*
the lower shell serving as a base for said subset,
*and means attached to* [the upper surface of] said center plate [having a slanted bracket attached thereto which mounts said dial,] *for mounting said calling device,* said transducer, and said [manual control means] *manually actuated hookswitch means* substantially within the confines of [said central aperture of said upper shell,] *the aperture in said front portion*
[the lower surface of said center plate mounting said hookswitch, and said actuating bars extending through said slots in said recessed portion of said upper shell].

8. A telephone subset as claimed in claim 7 wherein:
*said recessed portion includes two wells for receiving the two ends of said handset,* the bottom surfaces of said wells [are] *being* slanted downwardly from rear to front with respect to the horizontal,
*said handset actuated hookswitch means includes* [the] hookswitch actuating bars *which* are [pivoted] *pivotally mounted on said center plate* about an axis lying in front of said recessed portion,
and the top surfaces of said hookswitch actuating bars [which] extend through said *apertures* [slots] with said handset removed *and* are slanted downwardly from rear to front by an angle greater than the angle of slant of the bottom surfaces of said wells.

9. A telephone subset as claimed in claim 7 wherein *said means for mounting said calling device, said transducer and said manually actuated hookswitch means includes a slanted bracket,* said upper shell [is] *being* fastened to said slanted bracket with the outer edge of said shell abutting against said center plate.

10. A loudspeaking telephone subset comprising a handset and a plurality of other electrical components including [a push-button of translucent material] *switch means,* and also comprising:
an upper housing shell [of molded plastic material],
a lower housing shell [of molded plastic material],
a component-mounting center plate to which said upper and lower shells are fastened respectively,
the upper shell having a [flat] front portion with a central aperture therein,
the lower shell serving as a base for said subset,
and *a bracket assembly attached to* the center plate [having a bracket assembly attached thereto which mounts], *said bracket assembly mounting* said [push-button] *switch means* substantially [within] *in* the confines of said central aperture.

11. A loudspeaking telephone subset comprising a handset and a plurality of other electrical components including [a push-button of] *switch means including a* translucent [material] *portion* and a lamp therefor, and also comprising:

an upper housing shell [of molded plastic material], a lower housing shell [of molded plastic material], a component-mounting center plate to which said upper and lower shells are fastened respectively, the upper shell having a [flat] front portion with [a central] *an* aperture therein, the lower shell serving as a base for said subset, the center plate having a bracket assembly [attached thereto] which mounts said lamp substantially within the confines of said [central] aperture, and mounts said [push-button] *translucent portion of said switch means* so as to substantially overlie said lamp, a section of translucent plastic tubing through one end of which said lamp with its connecting wires is inserted, the bracket assembly having a pair of substantially coplanar [slots] *apertures* dimensioned and spaced so that, with the ends of said tubing section drawn through said [slots] *coplanar apertures*, said tubing section is bent into the shape of a U, the ends of said tubing section which form the legs of the U are held tightly in said [slots] *coplanar apertures*, and the lamp is held in place in the center portion of the U.

12. In a telephone subset, an arrangement for mounting a substantially cylindrically shaped signal lamp, said arrangement comprising:

a section of translucent tubing through one end of which said lamp with its connecting wires is inserted, and a mounting bracket having a pair of substantially coplanar [slots] *apertures* dimensioned and spaced so that, with the ends of said tubing section drawn through said [slots], *apertures*, said tubing section is bent into the shape of a U, the ends of the tubing section which form the legs of the U are held tightly in said [slots] *apertures*, and the lamp is held in place in the central portion of the U.

*13. A telephone subset comprising:*

*a handset,*

*a plurality of electrical components,*

*an upper shell supporting said handset and including an open bottom section,*

*a lower shell including an open top section and including a bottom portion serving as a base for said subset,*

*and a center plate to which said open sections of said two shells are fastened to form a closed housing, said center plate having said electrical components attached thereto.*

References Cited by the Examiner

The following references, cited by the Examiner, are of record in the patented file of this patent or the original patent.

FOREIGN PATENTS 3,274 5/1919 Netherlands.

KATHLEEN H. CLAFFY, *Primary Examiner.*

WILLIAM C. COOPER, ROBERT H. ROSE, *Examiners.*